Jan. 2, 1934. J. S. BENNETT 1,941,533
INDICATOR FOR AIRCRAFT
Filed June 23, 1930
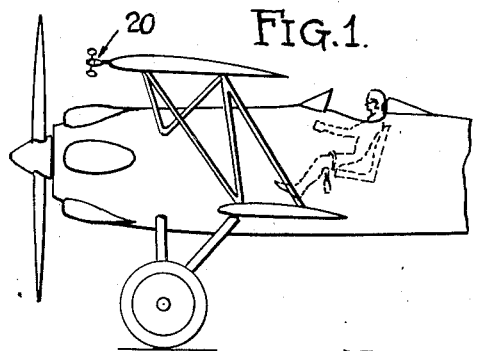
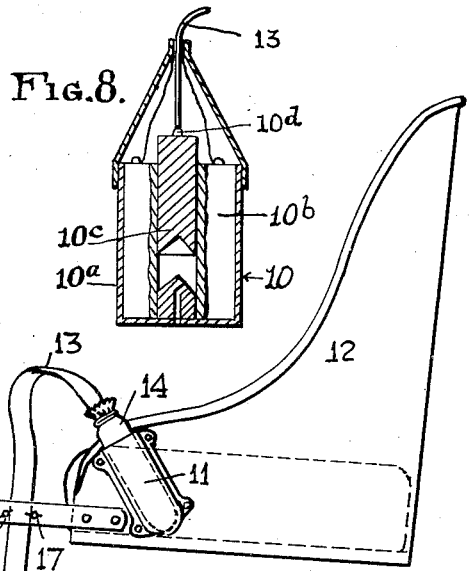
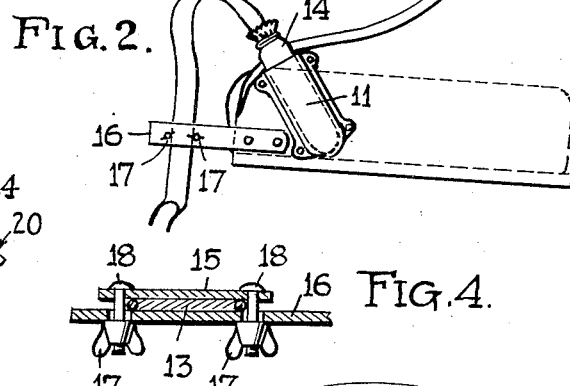
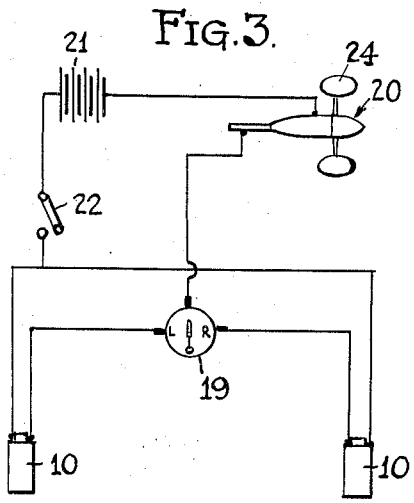
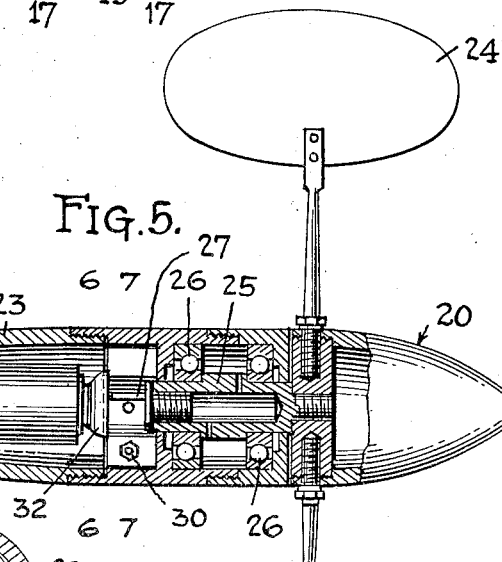
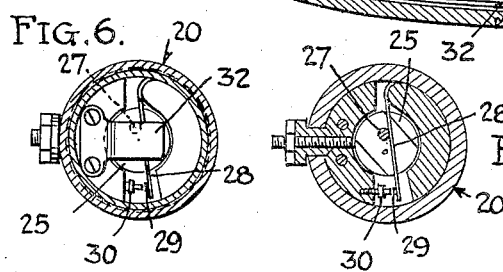
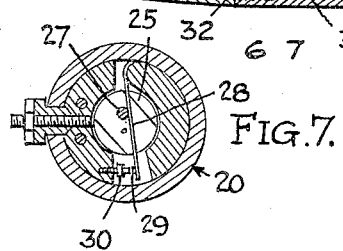
INVENTOR
JOSEPH S. BENNETT.
BY
ATTORNEY Patented Jan. 2, 1934

1,941,533

UNITED STATES PATENT OFFICE 1,941,533

INDICATOR FOR AIRCRAFT

Joseph S. Bennett, Bradford, Pa.

Application June 23, 1930. Serial No. 463,077

10 Claims. (Cl. 177—311)

My invention relates to aircraft and more particularly to flight position indicators for use in connection therewith.

In application, Serial #337,246, filed February 4, 1929, a form of flight position indicator in which the cutaneous senses of the pilot are acted upon is fully disclosed. The device or apparatus of said application not only signals that a deviation in the flight position or attitude of the craft has occurred, but it further indicates automatically the nature of and character of such deviation.

The objects and advantages of the present invention are generally the same as in said earlier filed application except that instead of a so-called "buzzer" acting directly upon the tactile senses of the pilot, vibratory weighted members are used; said members, during their period of activity, being responsive in movement to the action of a wind driven circuit breaker mounted on the aircraft and driven by the air rush incident to flight. In arriving at the form of signal herein disclosed, a number of experiments were conducted. All kinds of vibrators and solenoids were used experimentally. None, however, proved entirely satisfactory until it was clearly demonstrated that a signal acting to roll or oscillate the muscular or fleshy part of the thigh was in no way affected by the amount of clothing required to be worn by the pilot. Such a signal is less irritating, less startling, and a great deal more comfortable than the so-called "one spot" type of indicator heretofore employed. The idea, therefore, of giving the leg muscles or fleshy part of the leg a rolling or oscillating motion, no matter how accomplished, is an important and further object of the invention.

For an understanding of the invention and of the improvements herein disclosed, reference should be had to the accompanying drawing wherein like reference characters denote like or corresponding parts throughout the several views.

Of said drawing:

Fig. 1 is a side elevation of an aeroplane showing the relative location and arrangement of the various indicator parts;

Fig. 2 is a side elevation of the pilot's seat showing a preferred arrangement of the support for the indicator element;

Fig. 3 is a diagrammatic view of the electrical circuit of which the indicator elements form a part;

Fig. 4 is a detail sectional view of the strap adjusting mechanism;

Fig. 5 is an enlarged longitudinal sectional view of the wind driven circuit breaker, Figs. 6 and 7 are sectional views on the lines 6—6 and 7—7 respectively of Fig. 5, and Fig. 8 is a longitudinal sectional view of one of the solenoid units mounted on the ends of the straps.

In the embodiment of the invention selected for illustration indicators for indicating a deviation or change in the direction (yaw) or in the flight position of the aircraft are shown. Similarly operated indicating devices, if desired, may be provided for indicating deviations in pitch and/or lateral balance.

The indicators per se consist of solenoids 10 adapted, when not in use, for fitting engagement in pockets 11 fastened, one each, at opposite sides of the pilot's seat 12. To each solenoid is fastened a strap or the like 13 between or within the folds of which (see Fig. 4) wiring is laid for protection. As protection for the solenoids 10, fabric or leather casings 14 are used, each said sack or casing having at one end a draw-string (not shown). When in use, the solenoids 10, by means of the straps 13, are adapted to be hung on the inside of or between the pilot's legs, the straps being carried across and in direct contact with the leg covering. Thus arranged, the solenoids, when active, indicate by a slight tug or movement of the straps 13, the nature of and the fact that a deviation or change in the flight position of the craft has occurred. If the strap carried across the right leg is set in motion such activity indicates to the pilot that right rudder is required, whereas movement of the strap carried across the left leg indicates that the left rudder is required for corrective purposes. From actual test it has been found that indicators thus arranged and operated are neither irritating nor nerve racking in any way.

The construction of the solenoid and operating mechanism is shown in Fig. 8. Said unit consists of a casing 10a to which the strap 13 is fastened as shown. Within said casing 10a is enclosed a coil 10b which when energized moves relatively to a plunger 10c fastened as at 10d to the strap. The rise and fall of the casing 10a relatively to said plunger is the means relied upon to produce the tug or signal herein indicated. Any other suitable arrangement of parts adapted to similarly produce the desired tug on the strap 13 may be substituted for the unit illustrated.

For the purpose of adjusting the effective length of the straps 13, a clamp 15 for each strap is provided. The clamps 15 are carried by arms 16 disposed, one each, at opposite sides of the pilot's seat 12, and are fixed in adjusted position by wing nuts 17 threaded on bolts 18 passing thru both the arms 16 and the clamps 15. By loosening the wing nuts, and lengthening or shortening the effective length of the straps 13, the hanging position of the solenoids 10 may be varied to suit the individual requirements or comfort of the pilot.

From the straps 13, the solenoid wiring is carried to the turn indicator 19 of the machine. Said turn indicator 19 is of conventional design and gives at all times a visual indication of the yawing movements of the aircraft. Associated with said turn indicator 19 is an automatic switch (not shown) similar in construction and operation to the switch illustrated in my co-pending application Serial #337,246 above referred to. As in said co-pending application the automatic switch, normally open, is adapted to close the electrical circuit when and as a predetermined deviation or change in the flight position of the aircraft occurs.

There is also provided, within the electrical circuit, a wind driven variable speed circuit interrupter 20, a source of current supply 21, and a manually controlled switch 22. Preferably the circuit interrupter 20 is disposed in the air stream, (out on the wing leading edge or otherwise) and is adapted to make and break the electrical circuit continuously and at a given rate of speed depending upon the blade setting of the circuit interrupter. In the form of circuit interrupter illustrated (see Figs. 5, 6, and 7) the body or casing 23 is of stream-line shape and has attached to the forwardly rotating part thereof radial blades 24 which are freely adjustable as to pitch setting. In addition to the blades 24, the circuit interrupter comprises a shaft 25 mounted in ball bearings 26, an eccentric 27 mounted at one end of the shaft, a spring 28 carrying a contact 29 and against which spring the eccentric bears, a fixed contact 30, a condenser 31 and a spring 32 bearing on the condenser. The circuit interrupter is preferably self-lubricating as by means of an oil soaked wick (not shown) contained in the hollow of the shaft 25. If desired, a different form of circuit interrupter may be provided. The circuit interrupter should, however, function to make and break the electrical circuit whether or not the electrical circuit is otherwise closed. The diagrammatic view, Fig. 3, clearly illustrates the wiring arrangement of the complete electrical circuit.

From the above, taken in connection with the accompanying drawing, it is obvious that a position indicator, acting on the tactile senses of the pilot is provided; the operation of the indicating means being wholly automatic and responsive at all times to a predetermined deviation or change in the flight position of the machine. In providing a wind driven circuit interrupter, operable regardless of whether or not the electrical circuit is otherwise closed, movable weighted elements (solenoids) may be used to activate the indicating means at the desired frequency and at all times continuously so long as the deviation in flight position remains uncorrected for. Moreover, by adjusting the pitch setting of the blades of the circuit interrupter, its speed of rotation may be varied at will, and according to the speed of the aircraft in connection with which the device is used.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In combination, in aircraft, a normally open electrical circuit, means responsive to a predetermined change in the flight position of the aircraft to close said electrical circuit; an indicator comprising an element hung by a strap carried across and in contact with the person of the pilot of the aircraft; and means within said electrical circuit operable when said circuit is closed to move said element and hence said strap to indicate by a stimulation of the cutaneous senses of the pilot the fact that a change in the flight position of the aircraft has occurred.

2. In combination, in aircraft, a normally open electrical circuit, means responsive to a predetermined change in the flight position of the aircraft to close said electrical circuit; an indicator comprising an element carried by a strap and freely bodily movable from an inoperative position in which said strap is out of contact with to an operative position in which said strap is in operative contact with the person of the pilot of the aircraft; and means within said electrical circuit operable when said circuit is closed and when said strap is in an operative position to move said element and hence said strap to indicate by a stimulation of the cutaneous senses of the pilot the fact that a change in the flight position of the aircraft has occurred.

3. In combination, in aircraft, a normally open electrical circuit, means responsive to a predetermined change in the flight position of the aircraft to close said electrical circuit; an indicator including a solenoid hung by a strap carried across and in contact with the person of the pilot of the aircraft; and means within said electrical circuit operable when said electrical circuit is closed to render said solenoid alternately active and inactive, the movement of said solenoid and hence said strap being effective to indicate by a stimulation of the cutaneous senses of the pilot the fact that a deviation in the flight position of the aircraft has occurred.

4. As a signal to the pilot of an aircraft, means adapted to be carried across and in contact with the covering of the person of the pilot, and means operable to so move said first mentioned means as to cause the flesh of the pilot therebeneath to roll or oscillate back and forth as a signal.

5. As a signal to the pilot of an aircraft, a flexible element carried across and in contact with the covering of the person of the pilot, normally inactive means carried by said element adapted, when active, to so move said element as to cause the flesh beneath said element to roll or oscillate back and forth as a signal, and means operable to control the activity of said last mentioned means.

6. As a signal to the pilot of an aircraft, a flexible element adapted to be carried across and in contact with the covering of the person of the pilot, said element having a freely suspended outer end, and means carried by the free end of said element to move it, and by such movement stimulate the tactile senses of the pilot to in such manner offer the desired signal.

7. As a signal to the pilot of an aircraft, means adapted to extend cross-wise and in contact with the covering of the leg of the pilot, and means operable to so move said first mentioned means as to grip and displace the flesh of the leg as a signal.

8. As a signal to the pilot of an aircraft, means adapted to extend cross-wise and in contact with the covering of the person of the pilot, and means operable to so move said first mentioned means as to grip and displace the flesh of the pilot as a signal.

9. In combination, in aircraft, a normally open electrical circuit, means responsive to a predetermined change in the flight position of the aircraft to close said electrical circuit, a mechanically driven variable speed circuit interrupter within said electrical circuit operable independently of whether or not said electrical circuit is closed, the speed of operation of said circuit interrupter being dependent upon and variable with the speed of the aircraft, and a variable speed indicating means for signaling the fact that a deviation in the flight position of the aircraft has occurred, said indicating means being adapted to act upon the tactile senses of the pilot and being responsive in its operation to the operation of said circuit interrupter.

10. In combination, in aircraft, a normally open electrical circuit, means responsive to a predetermined change in the flight position of the aircraft to close said electrical circuit, a wind driven variable speed circuit interrupter within said electrical circuit operable independently of whether or not said electrical circuit is closed, the speed of operation of said circuit interrupter being dependent upon and variable with the speed of the aircraft, and a variable speed indicating means for signaling the fact that a deviation in the flight position of the aircraft has occurred, said indicating means being adapted to act upon the tactile senses of the pilot and being responsive in its operation to the operation of said circuit interrupter.

JOSEPH S. BENNETT.